(12) United States Patent
Sholl et al.

(10) Patent No.: US 12,496,706 B2
(45) Date of Patent: Dec. 16, 2025

(54) SLIDING TENDONS FOR HIGH-STRAIN ELASTOMER ACTUATORS

(71) Applicant: University of Florida Research Foundation, Incorporated, Gainesville, FL (US)

(72) Inventors: Nicholas R. Sholl, Gainesville, FL (US); Kamran Mohseni, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 526 days.

(21) Appl. No.: 17/664,237

(22) Filed: May 20, 2022

(65) Prior Publication Data

US 2023/0028442 A1 Jan. 26, 2023

Related U.S. Application Data

(60) Provisional application No. 63/208,847, filed on Jun. 9, 2021.

(51) Int. Cl.
  *B25J 9/14* (2006.01)
  *B25J 9/10* (2006.01)
  *C08J 5/04* (2006.01)

(52) U.S. Cl.
  CPC ............ *B25J 9/1075* (2013.01); *B25J 9/142* (2013.01); *C08J 5/046* (2013.01); *C08J 2383/04* (2013.01); *C08J 2423/28* (2013.01); *C08J 2427/12* (2013.01); *C08J 2427/16* (2013.01); *C08J 2471/10* (2013.01); *C08J 2477/06* (2013.01)

(58) Field of Classification Search
  CPC .................................. B25J 9/1075; B25J 9/14
  See application file for complete search history.

(56) References Cited

PUBLICATIONS

Shiva et al., Tendon-Based Stiffening for A Pneumatically Actuated Soft Manipulator, IEEE Robotics and Automation Letters, vol. 1, No. Jul. 2, 2016, p. 632-637.*
Sholl et al., Controlling the Deformation Space of Soft Membranes Using Fiber Reinforcement, The International Journal of Robotics Research. 2021;40(1):178-196.*
Choi et al., Design of Fully Soft Actuator with Double-Helix Tendon Routing Path for Twisting Motion, 2020 IEEE/RSJ International Conference on Intelligent Robots and Systems, Oct. 25-29, 2020. (Year: 2020).*
Cianchetti et al., Design concept and validation of a robotic arm inspired by the octopus, Materials Science and Engineering C (2011) 1230-1239. (Year: 2011).*

* cited by examiner

*Primary Examiner* — Nathaniel E Wiehe
*Assistant Examiner* — Daniel S Collins
(74) *Attorney, Agent, or Firm* — Alston & Bird LLP

(57) ABSTRACT

A soft structure fiber reinforcement and actuation technology is provided. In an example embodiment, the tendon-driven, fiber-reinforced elastomer membrane comprises an elastomer matrix material and a fiber array embedded within the elastomer matrix material. The one or more tendons are not mechanically bonded to the elastomer matrix material, such that the one or more embedded tendons are able to move through the elastomer matrix material. One or more apparatuses may employ one or more such tendon-driven, fiber-reinforced elastomer membranes for use in a variety of applications.

26 Claims, 16 Drawing Sheets

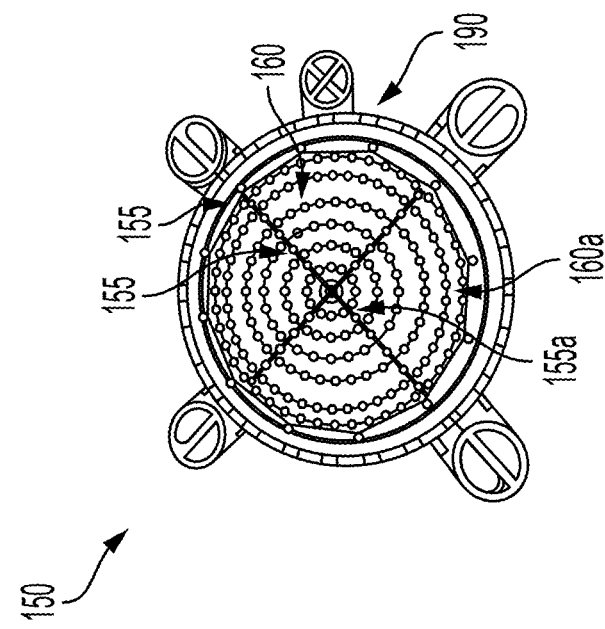
FIG. 1A
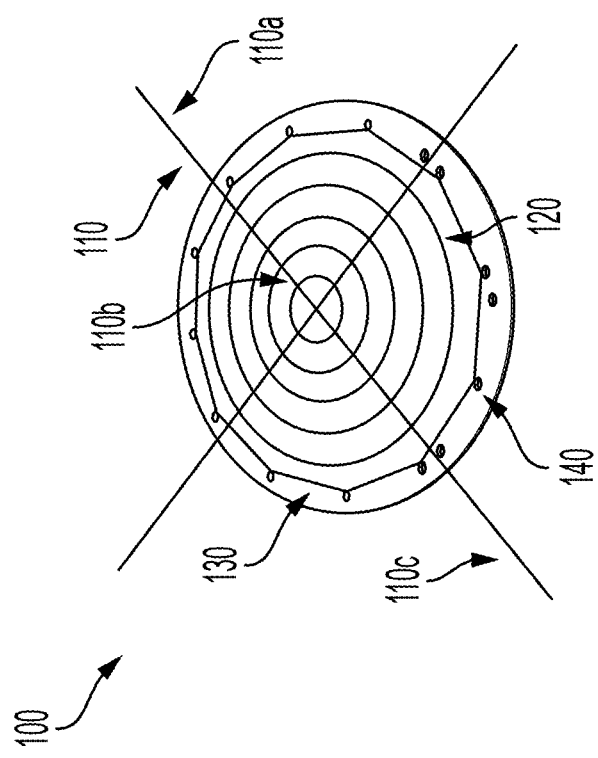
FIG. 1B
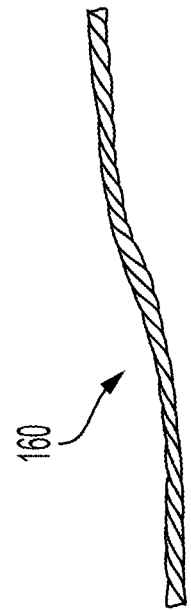
FIG. 1C
FIG. 1D

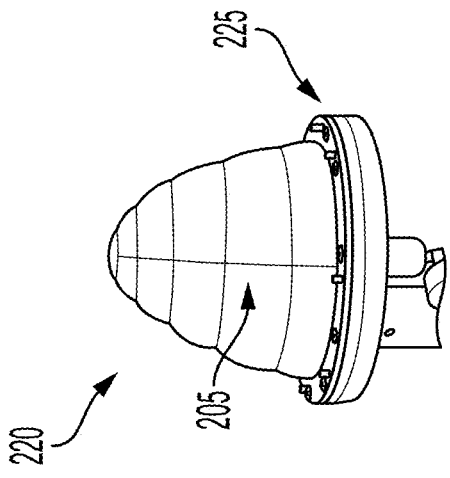
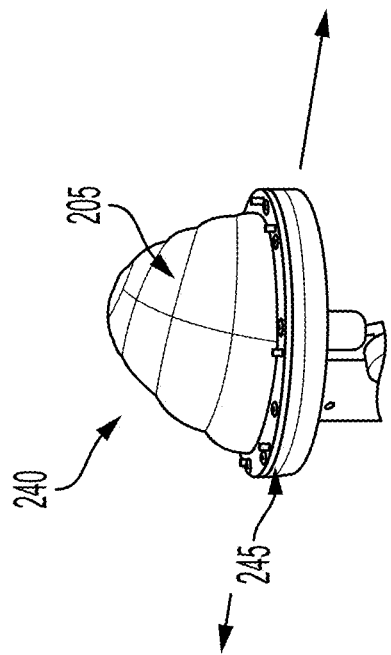
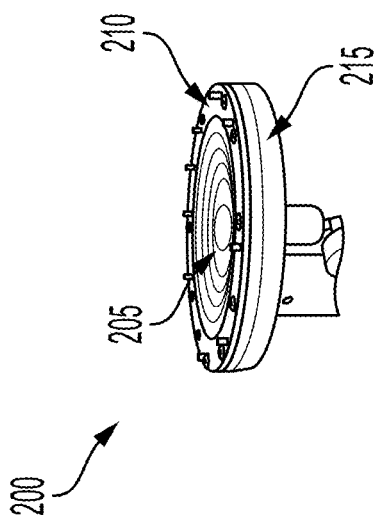
FIG. 2A
FIG. 2B
FIG. 2C

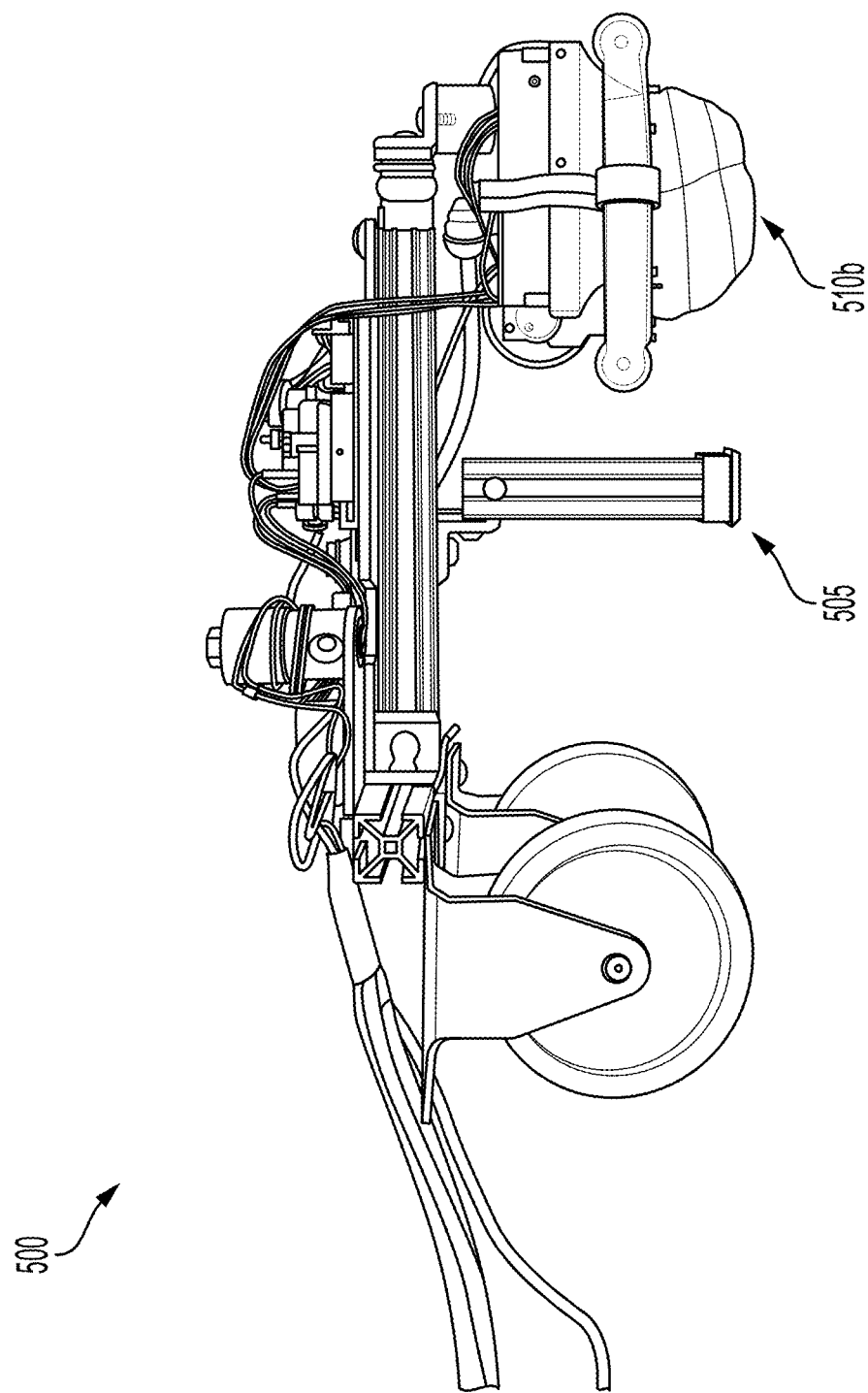

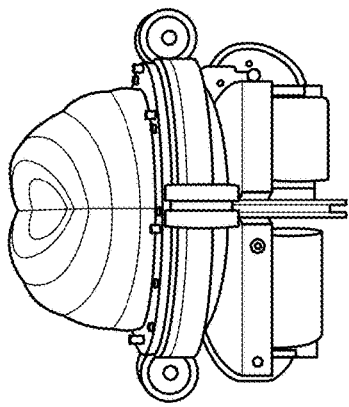
FIG. 8A Deflated
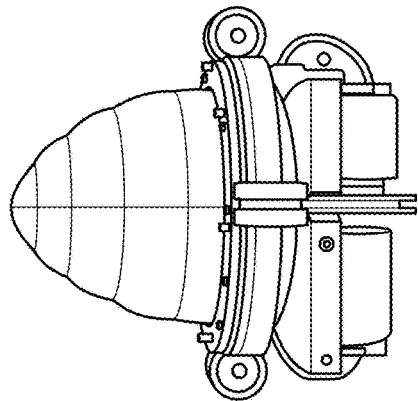
FIG. 8B Inflated
FIG. 8C One-tendon bend
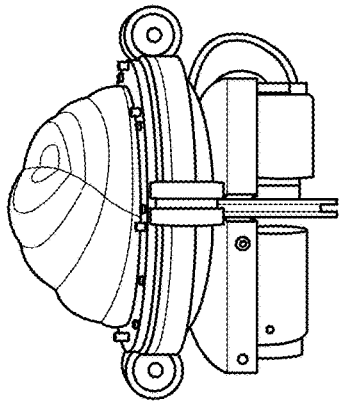
FIG. 8D Two-tendon bend
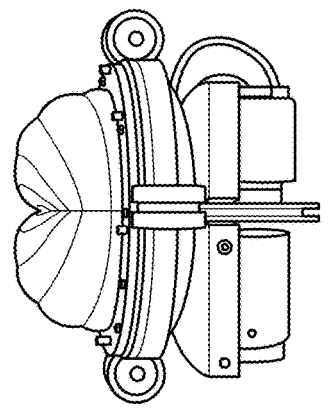
FIG. 8E Two-tendon grab
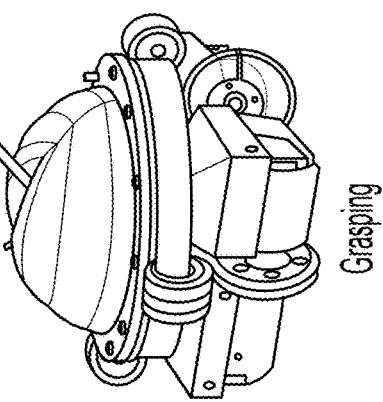
FIG. 8F Grasping

US 12,496,706 B2

SLIDING TENDONS FOR HIGH-STRAIN ELASTOMER ACTUATORS

CROSS REFERENCE TO RELATED APPLICATION

This application claims priority to and the benefit of U.S. Provisional Patent Application Ser. No. 63/208,847, filed Jun. 9, 2021; the entire contents of which as are hereby incorporated herein by reference.

FEDERALLY SPONSORED RESEARCH OR DEVELOPMENT

This invention was made with government support under 1638034 awarded by the National Science Foundation and with government support under N00014-16-1-2083 award by the US Navy Office of Naval Research. The government has certain rights in the invention

BACKGROUND

Rigid structures are prone to critical failure when disturbances or perturbations result in high enough stress. For example, rigid robotic structures are prone to critical failure. In contrast, soft, flexible structures may be capable of bending and thus may accommodate such a disturbance and return to an operational state. As an additional example, traditional rigid robotic actuators do not drive motion of soft structures effectively, because they rely on transmitting large torques/forces through small contact points. Furthermore, it may be advantageous to change the shape and/or material properties of various structures, which may not be accomplished using traditional rigid structures. Thus, a need exists for soft structures with selectively controllable geometry and stiffness control.

BRIEF SUMMARY

According to various embodiments, a tendon-driven, fiber-reinforced elastomer membrane is described. The membrane comprises an elastomer matrix material; and a fiber array embedded within the elastomer matrix material, wherein: the fiber array comprises one or more tendons; and the one or more tendons are not mechanically bonded to the elastomer matrix material such that the one or more embedded tendons are able to move through the elastomer matrix material.

According to various embodiments, an inflatable apparatus is also described. The apparatus comprises: one or more tendon-driven, fiber-reinforced elastomer membranes, each of the one or more tendon-driven, fiber-reinforced elastomer membranes comprising: an elastomer matrix material; and a fiber array embedded within the elastomer matrix material, wherein: the fiber array comprises one or more tendons; and the one or more tendons are not mechanically bonded to the elastomer matrix material such that the one or more embedded tendons are able to move through the elastomer matrix material. The apparatus further comprises: a rigid plate, wherein the rigid plate comprises one or more fluid ports; a clamp ring; and one or more securing components, wherein the one or more securing components secures the clamp ring to the rigid plate.

BRIEF DESCRIPTION OF SEVERAL VIEWS OF THE DRAWING(S)

Reference will hereinafter be made to the accompanying drawings, which are not necessarily drawn to scale, and wherein:

FIGS. 1A-D provide examples of a tendon-driven, fiber-reinforced elastomer membrane with an embedded fiber array within an elastomer matrix material, in accordance with some embodiments of the present invention;

FIGS. 2A-C show an example tendon-driven, fiber-reinforced elastomer membrane in a deflated, inflated, and actuated state in accordance with some embodiments of the present invention;

FIG. 3 shows an example actuated tendon-driven, fiber-reinforced elastomer membrane as an inflatable apparatus, in accordance with some embodiments of the present invention;

FIGS. 4A-C show an example tendon-driven, fiber-reinforced elastomer membrane operating as an inflatable apparatus in an inflated and actuated state, in accordance with some embodiments of the present invention;

FIGS. 5A-D show an example tendon-driven, fiber-reinforced elastomer membrane operating as an inflatable apparatus in conjunction in operation with a robot, in accordance with some embodiments of the present invention;

FIGS. 6A-C show an example tendon-driven, fiber-reinforced elastomer membrane in operation as an inflatable arm, in accordance with some embodiments of the present invention;

FIG. 7 shows an exploded view of an example fiber array with a clamp assembly;

FIGS. 8A-F show an example inflatable apparatus which uses a tendon-driven, fiber-reinforced elastomer membrane in various states of actuation, in accordance with some embodiments of the present invention;

Figure 13:
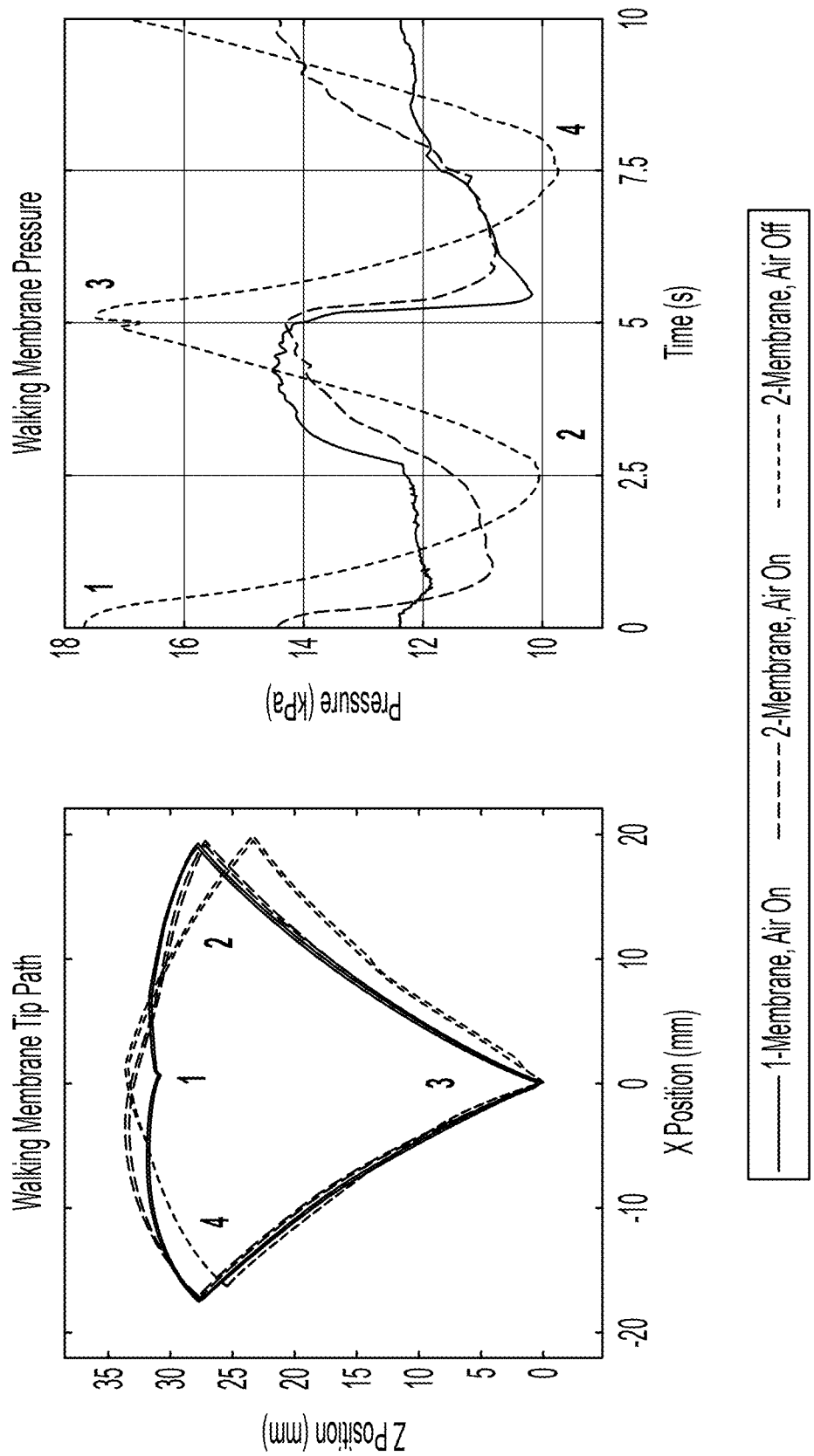

FIGS. 12A-D show example actuated tendon-driven, fiber-reinforced elastomer membranes as an inflatable apparatus, in accordance with some embodiments of the present invention;

FIG. 13 show a characterization profile for an example tendon-driven, fiber-reinforced elastomer membrane operating as an inflatable apparatus in conjunction in operation with a robot, in accordance with some embodiments of the present invention; and FIGS. 14A-D show an example tendon-driven, fiber-reinforced elastomer membrane operating as an inflatable apparatus in conjunction in operation with a robot, in accordance with some embodiments of the present invention.

DETAILED DESCRIPTION

The present invention will now be described more fully hereinafter with reference to the accompanying drawings, in which some, but not all embodiments of the invention are shown. Indeed, certain embodiments of the invention may be embodied by many different forms and should not be construed as limited to the embodiments set forth herein; rather, these embodiments are provided so that this disclosure will satisfy applicable legal requirements. Like numbers refer to like elements throughout.

FIG. 1A shows an example tendon-driven, fiber-reinforced elastomer membrane 100. In some embodiments, the tendon-driven, fiber-reinforced elastomer membrane 100 comprises an elastomer matrix material 130 and a fiber array 150 (see also FIG. 1B). In some embodiments, the fiber array 150 comprises one or more tendons 110, visible in both FIGS. 1A and D. In some embodiments, the fiber array 150 may also comprise one or more fixed fibers 120.

In some embodiments, the elastomer matrix material 130 may be an elastic material that allows for large strains. For example, the elastomer matrix material may include a silicone material. In an example embodiment, the elastomer matrix material 130 may be constructed out of Ecoflex 30 elastomer from Smooth-On Inc. In some embodiments, the tensile strength of the elastomer matrix material is up to 200 pound-force per square inch (psi). In some embodiments, the 100% modulus of the elastomer material up to 10 psi. In some embodiments, the elongation at break of the elastomer material is up to 900 percent. Of course, additional or other elastomers may be used, as desirable for certain applications.

FIG. 1B shows an example a fiber array 150 comprising one or more tendons 155 (see also FIG. 1C). In some embodiments, the fiber array 150 comprises one or more fixed fibers 160 (see also FIG. 1D). In some embodiments, the one or more tendons 155 may be interwoven between others of the one or more tendons 155 and/or one or more fixed fibers 160 of the fiber array 150. For example, one or more fixed fibers 160 may take the form of concentric rings of varying radii, for example, by knotting a first end and second end of a fixed fiber 160 together to form a knot 160a. In some embodiments, the knot 160a formed by the first end and second end of the fixed fiber 160 may be coated in an adhesive, such as cyanoacrylate glue, to prevent or mitigate slipping or untying of said knot 160a. In some embodiments, the one or more fixed fibers 160 may form a continuous ring, such that the one or more fixed fibers 160 do not require knots 160a. The one or more fixed fibers 160 may thus, in certain embodiments, be arranged throughout the fiber array 150. In some embodiments, the one or more fixed fibers 160 may be equally distributed throughout tendon-driven, fiber-reinforced elastomer membrane; in other embodiments, distribution may be non-uniform, if desired.

Still further, one or more tendons 155 may be woven through and/or around the one or more fixed fibers 160. In some embodiments, one end of the one or more tendons 155 may be anchored to a fixed fiber 160, for example, by knotting the tendon 155 around the fixed fiber 160 to form a knot 155a. In some embodiments, the tendon 155 may be knotted around the innermost fixed fiber 160 or otherwise. In some embodiments, interweaving the one or more tendons 155 may aid in constraining the one or more tendons such that the one or more tendons don't undesirably shift and/or move during actuation/de-actuation and/or inflation/deflation. In some embodiments, interweaving the one or more tendons 155 may also aid in preventing the one or more tendons from ripping through the elastomer matrix material 130 at high stress locations, such as at the internal edge of a clamp ring. In some embodiments, four tendons may be included in the fiber-reinforced elastomer membrane. Each of the fibers may be spaced substantially equidistant from one another.

In certain embodiments, the one or more tendons may also be of sufficient length, such that a first end and second end of a tendon extend past the edge of the tendon-driven, fiber-reinforced elastomer membrane 100. As a result, the first end and second end may be grasped externally in at least one embodiment, such that an embedded portion of the length of a tendon may be embedded within the elastomer matrix material 130, while a first external portion of the length and/or a second external portion of the length of the tendon may be external the elastomer matrix material 130. For example, FIG. 1A shows the first external portion 110a of a tendon 110, the embedded portion 110b of the tendon 110, and the second external portion 110c of the tendon 110.

In some embodiments, the length of the first and/or second external portions of the length of the one or more tendons 155 may satisfy a length threshold such that the length of the first and second external portions of the length of the tendon are sufficient such that the length of the one or more tendons 110 are longer than the diameter of the tendon-driven, fiber-reinforced elastomer membrane 100. The diameter of the tendon-driven, fiber-reinforced elastomer membrane may be any suitable size. In some embodiments, the diameter of the tendon-driven, fiber-reinforced elastomer membrane may range between approximately 100 millimeters to 125 millimeters. In some embodiments, the diameter of the tendon-driven, fiber-reinforced elastomer membrane is approximately 114 millimeters.

In some embodiments, the length of the one or more tendons 110 is sufficient such that the first external portion and/or second external portion of the tendons may be grasped or otherwise interacted with. For example, the length of the first and second external portions of the length may be configured such that both ends are easily accessed such that they may be manipulated. In some embodiments, a portion of the first and second external length portions of the one or more tendons may be wound. In some embodiments, a portion of the first and second external length portions of each of the one or more tendons may be wound in utilizing one or more pulleys 310, as depicted later in FIG. 3.

In some embodiments, the one or more tendons 155 may be comprised of a sufficiently smooth fiber. FIG. 1C depicts a single tendon 155. In some embodiments, the one or more tendons are monofilament fibers. In some embodiments, the static coefficient of friction between the one or more tendons 155 and the elastomer matrix material 130 is sufficiently low, such that the one or more embedded tendons 155 may slide through the elastomer matrix material 130 with low resistance. For example, in some embodiments, the static coefficient of friction between the one or more monofilament fibers and the elastomer matrix material 160 may be 0.3 or less. In some embodiments, the smoothness of the one or more tendons may prevent and/or limit the amount of the elastomer matrix material permeating the one or more associated pores of the one or more tendons 155, such as during curing. In some embodiments, the surface roughness of the one or more monofilament fibers 155 may be below a predefined surface roughness value. Surface roughness may be measured in a variety of way including but not limited to arithmetical mean deviation, root mean squared, and/or variations thereof. For example, in some embodiments, the one or more monofilament fibers may have an arithmetic average roughness of 0.4 micrometers or less. As such, in some embodiments, the one or more tendons 155 do not mechanically bond to the elastomer matrix material 130.

In some embodiments, the one or more tendons 155 may be cylindrical in shape. In some embodiments, the one or more tendons are comprised of one or more polymeric materials. In some embodiments, the one or more tendons may be comprised of nylon, polyvinylidene fluoride (PVDF), polyethylene. In some embodiments, the one or more tendons may be comprised of one or more fluoropolymers including fluorinated ethylene propylene (FEP), perfluoroalkoxy alkane (PFA), ethylene tetrafluoroethylene (ETFE), polyether ether ketone (PEEK). In some embodiments, each of the one or more tendons 155 are comprised of the same material. In some embodiments, the one or more tendons 155 are comprised of one or more different materials.

In some embodiments, the one or more fixed fibers 160 may be comprised of the same one or more materials as the one or more tendons 155 as described above. In some embodiments, the one or more fixed fibers 160 may be comprised of different, for example, one or more rough fibers. For example, the one or more fixed fibers 160 may be comprised of yarn, cotton thread, or the like. FIG. 1D depicts a single fixed fiber 160. In some embodiments, the static coefficient of friction between the one or more fixed fibers 160 and the elastomer matrix material 130 is larger than the coefficient of bonding between the one or more one or more tendons 155 and the elastomer matrix material 130. In some embodiments, the static coefficient of friction between the elastomer matrix material 130 and the one or more fixed fibers is sufficiently large such that the one or more embedded tendons either do not slide through the elastomer matrix material 130 or slide with a high resistance. For example, in some embodiments, the one or more fixed fibers 160 may have a static coefficient of friction with the elastomer matrix material 130 greater than 0.3. In some embodiments, the smoothness of the one or more fixed fibers 160 may promote permeation of the elastomer matrix material 130 into the one or more associated pores of the one or more fixed fibers 160, such as during curing. In some embodiments, the one or more fixed fibers 160 may have a larger arithmetic average roughness than that of the one or more monofilament fibers 155. For example, in some embodiments, the one or more monofilament fibers may have an arithmetic average roughness of 10 micrometers or more. As such, the one or more fixed fibers 160 may mechanically bond to the elastomer matrix material 130.

In some embodiments, the fiber array 150 may be initially arranged in a mold base, such as mold base 190. In some embodiments, the one or more fixed fibers 120 are formed into concentric circles and are arranged throughout the mold base 190. In some embodiments, the radii of the one or more fixed fibers may vary. In some embodiments, the radii of the one or more fixed fibers 120 may be the same. In some embodiments, the one or more fixed fibers 120 may be equally distributed throughout the mold base 190 such that the one or more fixed fibers are equally distributed throughout the tendon-driven, fiber-reinforced elastomer membrane 100. In some embodiments, the one or more fixed fibers may be unequally distributed throughout the mold base 190 such that the one or more fixed fibers are unequally distributed throughout the tendon-driven, fiber-reinforced elastomer membrane 100.

In some embodiments, the one or more tendons 110 pass through the center of the one or more concentric circles formed by the one or more fixed fibers 120. In some embodiments, the one or more tendons 110 are bonded to the one or more fixed fibers 120. In some embodiments, the one or more tendons 110 are bonded to the innermost fixed fiber of the one or more fixed fibers 120. In some embodiments, the one or more tendons 110 are bonded to one or more fixed fibers at each point where the one or more tendons 110 intersect the one or more fixed fibers 120.

In some embodiments, the mold base 190 may be indicative of the overall shape of the tendon-driven, fiber-reinforced elastomer membrane 100. The shape of the tendon-driven, fiber-reinforced elastomer membrane 100 may be configurable. In some embodiments, the tendon-driven, fiber-reinforced elastomer membrane 100 may generally define a sheet plane such that the shape of the tendon-driven, fiber-reinforced elastomer membrane 100 is generally planar. In some embodiments, the tendon-driven, fiber-reinforced elastomer membrane 100 may be generally cylindrical or curved and the sheet plane may be locally defined as the plane tangent to the local curvature of the tendon-driven, fiber-reinforced elastomer membrane 100. In some embodiments, the shape of the tendon-driven, fiber-reinforced elastomer membrane 100 may be generally conical. In some embodiments, the shape of the tendon-driven, fiber-reinforced elastomer membrane 100 may be generally spherical. The fiber array 150 may be arranged in a suitable configuration to match the desired shape of the tendon-driven, fiber-reinforced elastomer membrane 100. However, as will be obvious to one of skill in the art, any geometric configuration of the tendon-driven, fiber-reinforced elastomer membrane 100 may be contemplated. Generally, the thickness of the tendon-driven, fiber-reinforced elastomer membrane 100 may be small. For example, the thickness of the tendon-driven, fiber-reinforced elastomer membrane 100 may be significantly smaller than the width and/or length of the tendon-driven, fiber-reinforced elastomer membrane 100. In some embodiments, the tendon-driven, fiber-reinforced elastomer membrane may range between 2 millimeters to 10 millimeters in thickness. In some embodiments, the tendon-driven, fiber-reinforced elastomer membrane is approximately 5 millimeters thick.

Once the fiber array 150 is sufficiently configured, the elastomer matrix material 130, which may be initially in liquid form, may be poured into the mold base 190 to a sufficient height. For example, the elastomer matrix material 130 may be poured such that it covers the highest point of the fiber array 150 by a threshold height. In some embodiments, the fiber array 150 may be embedded within the center of the elastomer matrix material 130. In some embodiments, the elastomer matrix material 130 may be degassed before and/or after pouring into the mold base 190. The elastomer matrix material 130 may be allowed to cure for one or more predetermined durations of time and at one or more predetermined temperatures. For example, the elastomer matrix material 130 may be allowed to cure at room temperature for 24 hours, 80° C. for 2 hours, and 100° C. for 1 hour. In some embodiments, the elastomer matrix material 130 may be allowed to cure at room temperature. After curing, the elastomer matrix material 130 may form a solid but elastic material with an embedded fiber array 150 and may thus form the tendon-driven, fiber-reinforced elastomer membrane 100.

During the curing process, the elastomer matrix material 130 may not significantly chemically and/or mechanically bond to the one or more tendons 155 comprising the fiber array 150. This may be due to the relatively small arithmetic average roughness of the one or more tendons. As such, the one or more tendons 155, although embedded within the elastomer matrix material 130, may have the freedom to glide or otherwise move within the elastomer matrix material 130. In some embodiments, the elastomer matrix material 130 may chemically and/or mechanically bond to the one or more fixed fibers 160 comprising the fiber array 150.

As such, the one or more fixed fibers embedded within the elastomer matrix material 130 may provide fixed, non-adjustable support.

FIGS. 2A-C illustrate the tendon-driven, fiber-reinforced elastomer membrane as an inflatable apparatus. In some embodiments, the tendon-driven, fiber-reinforced elastomer membrane 100 may be secured to a flat, rigid plate 215 using a clamp ring 210 as depicted in FIG. 2A. The clamp ring 210 may have a smaller diameter than the tendon-driven, fiber-reinforced elastomer membrane and as such, the tendon-driven, fiber-reinforced elastomer membrane may be fitted over the clamp ring 210. In some embodiments, the clamp ring 210 may have a diameter between approximately 85 millimeters to 110 millimeters. In some embodiments, the clamp ring 210 has a diameter of approximately 94 millimeters.

In some embodiments, the tendon-driven, fiber-reinforced elastomer membrane 205 may include one or more clamp entry hole 140 (FIG. 1A) for the clamp ring 210 to be attached to the rigid plate 215. In some embodiments, the clamp ring 210 may secure the tendon-driven, fiber-reinforced elastomer membrane 205 using one or more screws that extend from the clamp ring 210, through the tendon-driven, fiber-reinforced elastomer membrane 205 such as through one or more clamp entry holes 140, and into the rigid plate 215. One or more fluid ports within the rigid plate may allow fluid to enter the cavity between the rigid plate and the membrane, thus inflating the membrane with the fluid. The tendon-driven, fiber-reinforced elastomer membrane 100 may expand and inflate away from the rigid plate. In some embodiments, the one or more fluid ports may be fluidically connected to one or more fluid pumps.

FIG. 2A also depicts the tendon-driven, fiber-reinforced elastomer membrane 205 in a deflated state 200. For example, little to no fluid may occupy the cavity between the rigid plate 215 and the tendon-driven, fiber-reinforced elastomer membrane 205, thus resulting in the deflated state 200.

FIG. 2B shows the tendon-driven, fiber-reinforced elastomer membrane 205 in an inflated state 220. For example, a volume of fluid may enter or otherwise occupy a partial or full volume of the cavity between the rigid plate 215 and the tendon-driven, fiber-reinforced elastomer membrane 205. As the tendon-driven, fiber-reinforced elastomer membrane 205 inflates due to the presence of the fluid within the cavity between the space between the rigid plate 215 and the tendon-driven, fiber-reinforced elastomer membrane 205, the one or more tendons comprising the fiber array are drawn into the elastomer matrix material and are pulled by one or more attachment points, e.g. one or more knots formed by a tendon around one or more fixed fibers. The one or more tendons may be pulled by the one or more attachment points onto the innermost fixed fiber and allow for the expansion to occur.

FIG. 2C shows the tendon-driven, fiber-reinforced elastomer membrane 205 in an actuated state. The tendon-driven, fiber-reinforced elastomer membrane 205 may enter an actuated state by applying tension to one or more tendons. Applying tension to the one or more tendons may add stress to the tendon-driven, fiber-reinforced elastomer membrane 205. The asymmetric application of tension to the one or more tendons may cause a shift in the geometry of the tendon-driven, fiber-reinforced elastomer membrane 205 in the inflated state. For example, pulling a tendon end away from the center of the tendon-driven, fiber-reinforced elastomer membrane 205 may cause the tendon-driven, fiber-reinforced elastomer membrane 205 to bend in that direction. This may be due in part to the one or more attachment points between the one or more tendons and the one or more fixed fibers, which may experience a force in a direction of the applied tension. Additionally, applying tension to the one or more tendons may cause a change in the portion of the length of the embedded portion of the one or more tendons and the first and second external portions of the one or more tendons. For example, applying tension to a tendon may cause the length of the embedded portion of the tendon to decrease and the length of the first and second external portions of the tendon to increase. The resulting pressure experienced across the tendon-driven, fiber-reinforced elastomer membrane 205 may be based at least in part on the length of the one or more tendons, particularly the length of the embedded portion of the one or more tendons. As such, the tracking the length of each tendon and the pressure across the tendon-driven, fiber-reinforced elastomer membrane 205 may enable geometric control of the inflatable apparatus.

Figure 3:
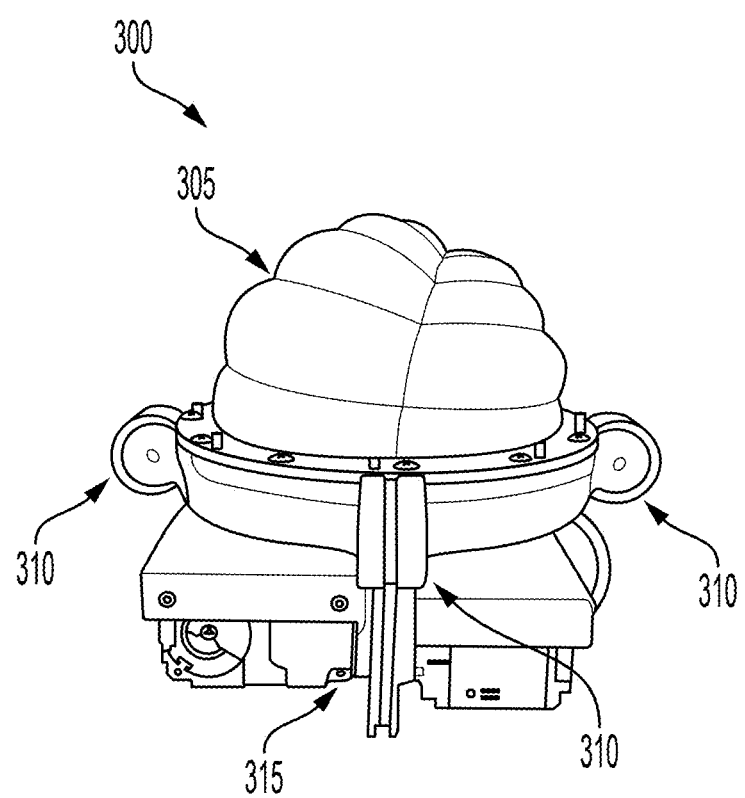

In some embodiments, the length of each tendon and/or the pressure across the tendon-driven, fiber-reinforced elastomer membrane may be controlled in part using a servomotor. FIG. 3 illustrates an example tendon-driven, fiber-reinforced elastomer membrane 305 with a servomotor 315 and one or more pulleys 310. In some embodiments, each end of the one or more tendons may be attached to the servomotor 315. In some embodiments, a portion of the first and second external length of the one or more tendons may be wound around one or more pulleys 310. In some embodiments, the servomotor 315 may be a rotary actuator and/or linear actuator capable of controlling the angular and/or linear position of the first end and second end of the one or more tendons. For example, the servomotor 315 may be actuated such that the embedded length of the one or more tendons may be shortened. As another example, the servomotor 315 may be actuated such that the embedded length of the one or more tendons may be lengthened. In some embodiments, the servomotor 315 may provide a torque feedback indicative of the pressure experienced by the tendon-driven, fiber-reinforced elastomer membrane 205. In some embodiments, the servomotor 315 may provide a length feedback indicative of current embedded length of the one or more tendons.

Figure 7:
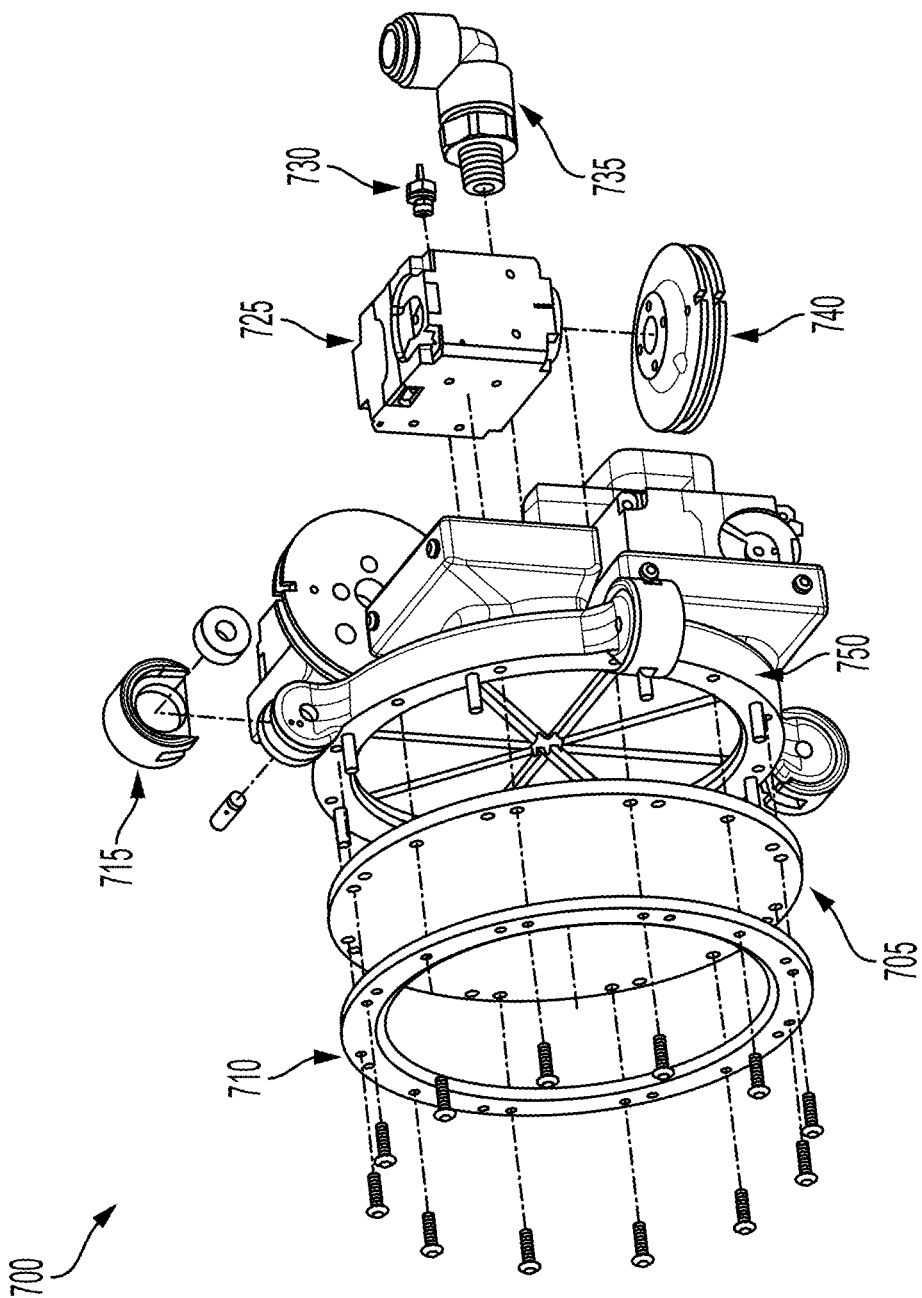

FIG. 7 further depict an exploded view of an example apparatus which uses a tendon-driven, fiber-reinforced elastomer membrane. In particular, the tendon-driven, fiber-reinforced elastomer membrane 705 may be positioned between a clamp ring 710 and a clamp body 750. The tendon-driven, fiber-reinforced elastomer membrane 705 may be positioned over a plurality of attachment points upon the clamp body 750 and the clamp ring 710 may be further positioned over the tendon-driven, fiber-reinforced elastomer membrane. One or more securing screws may be used to tighten the clamp ring 710 to the clamp body 750 configured with one or more threaded holes. The clamp force exerted by the clamp ring 710 may be controlled by the tightness of the one or more screws. The clamp force may control the amount of fluid which can leak from the tendon-driven, fiber-reinforced elastomer membrane through the clamp. The clamp force may also determine the friction experienced by each tendon.

Each tendon (not shown) may be threaded between a tendon guide 715 and a ball bearing. They may further be wrapped around a pulley 740. The pulley 740 may further be connected to a servomotor 725, which may be used as a rotary actuator and/or linear actuator, as described above. Furthermore, the clamp body 750 may be configured with a pressure tap 730 and/or tube fitting 735, thereby allowing pneumatic actuation of the tendon-driven, fiber reinforced elastomer membrane 705. In some embodiments, the servomotor 725 may provide feedback (e.g., torque feedback, length feedback, etc.)

Figure 4A:
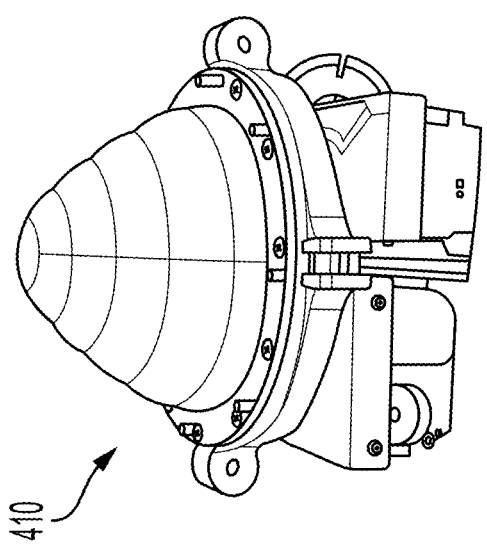

FIG. 4A illustrates an inflatable apparatus comprising a tendon-driven, fiber-reinforced elastomer membrane with a servomotor and one or more pulleys. In the inflated state 410, the embedded length of the one or more tendons may be controlled such that the tension applied to the tendon-driven, fiber-reinforced elastomer membrane is minimal. For example, during the inflated state 410, the tendon-driven, fiber-reinforced elastomer membrane may be able to fully expand.

Figure 4C:
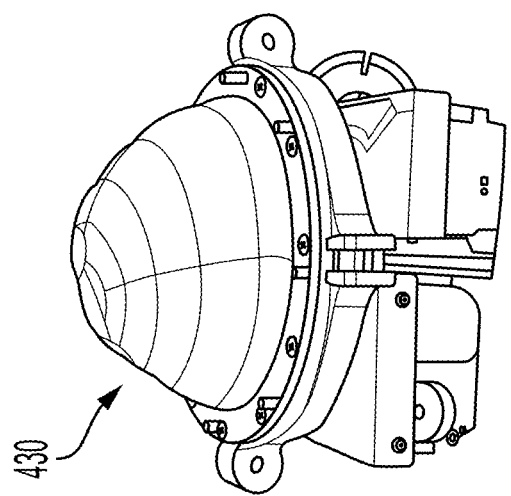
Figure 4B:
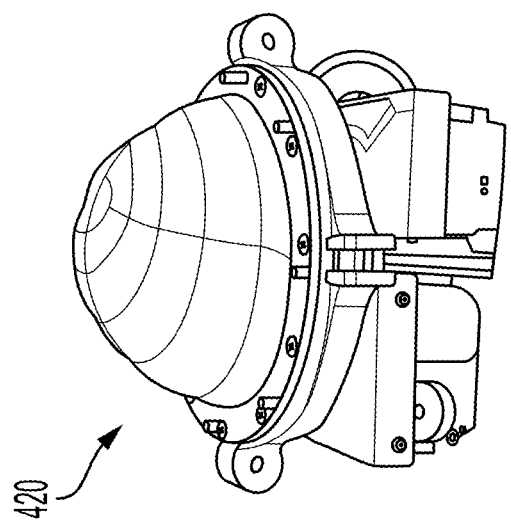

FIGS. 4B-C illustrate an example actuated state 420 and 430 of the tendon-driven, fiber-reinforced elastomer membrane utilizing a servomotor and one or more pulleys. During the actuated state 420, the embedded length of the tendon may be shortened on the right side, such that the tensions applied to the tendon-driven, fiber-reinforced elastomer membrane is asymmetric and greater on the right side. For example, this may occur in part due to one or more attachment points, e.g. one or more knots formed by a tendon around one or more fixed fibers, which may apply a force to the fixed fiber. Since the fixed fiber may be embedded in, and in some instances, chemically and/or mechanically bonded with the elastomer matrix material, the asymmetric application of tension to the right-most tendon results in a compressed tendon-driven, fiber-reinforced elastomer membrane with a right-leaning curvature. Similarly, during the actuated state 430, the embedded length of the tendon may be shortened on the left side, such that the tension applied to the tendon-driven, fiber-reinforced elastomer membrane is asymmetric and greater on the left side. This results in a compressed tendon-driven, fiber-reinforced elastomer membrane with a left-leaning curvature.

Similarly, FIGS. 8A-F depicts an example apparatus configured with a tendon-driven, fiber-reinforced elastomer membrane in various states of actuation. In particular, FIG. 8A shows the apparatus in the deflated state and FIG. 8B shows the apparatus in the inflated state without any tendon actuation. FIG. 8C shows the apparatus in an actuated state. Here, the apparatus is configured with four tendons and one tendon is actuated via applied tension. As such, the tendon-driven, fiber-reinforced elastomer membrane transforms from a substantially symmetrical inflated state to an asymmetric state with a curvature (e.g., bend) in the membrane. FIG. 8D also shows the apparatus in an actuated state using two tendons. Here, a more pronounced curvature is depicted due to tension applied to two adjacent tendons. Alternatively, a two tendon actuation may apply tension to two tendons of opposite sides as shown in FIG. 8E, resulting in a grabbing motion of the membrane. As shown in FIG. 8F, the two tendon actuation with applied tension to tendons of opposite sides may be used to grasp objects in between the outer surface of the membrane. The grasping strength applied by the membrane may be controlled by the tension applied to the tendons. For example, greater applied tension to one or more of the two tendons may result in a stronger grasp by the membrane. In some embodiments, the grasping force may also be controlled by changing the inflation pressure.

Figure 9:
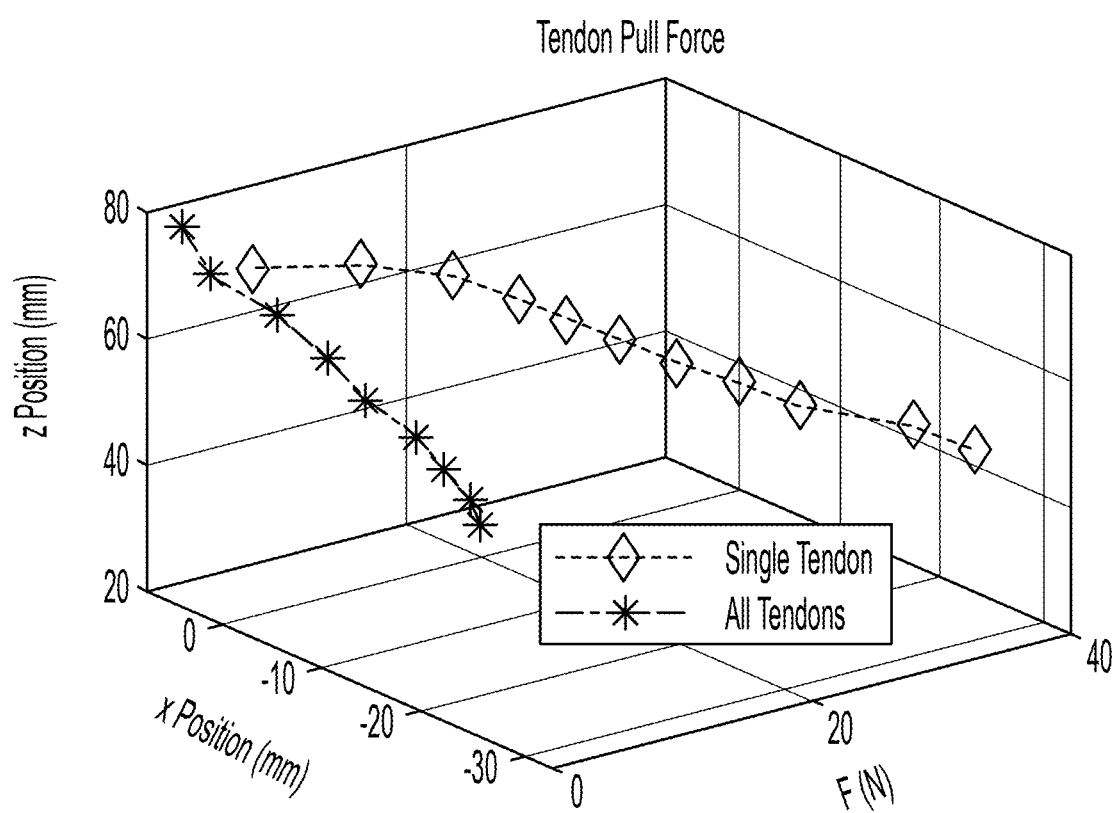
FIG. 9 shows a plot of the applied tendon pull force to an apparatus using a tendon-driven, fiber-reinforced elastomer membrane required for various actuation positions of the tendon-driven, fiber-reinforced elastomer membrane, in accordance with some embodiments of the present invention.
Figure 10:
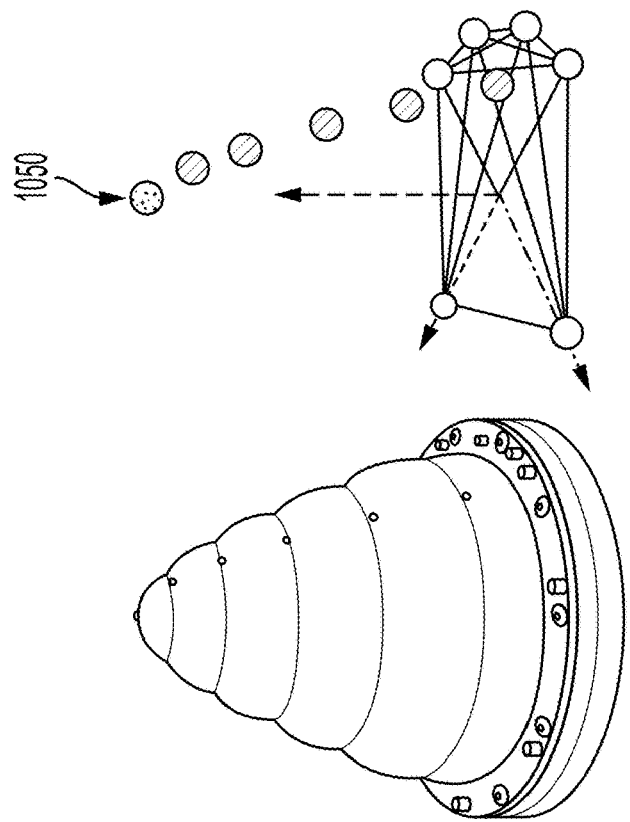
FIG. 10 shows an example inflatable apparatus in an inflated state, in accordance with some embodiments of the present invention.
Figure 12A:
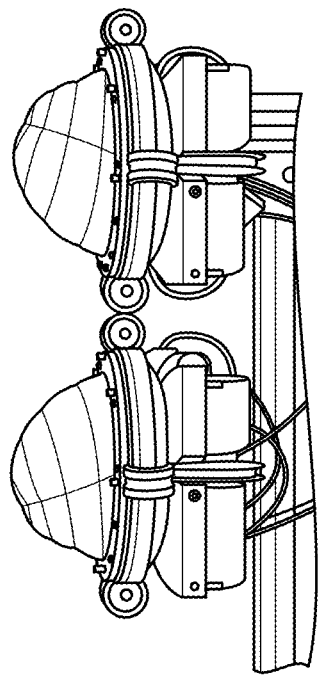
Figure 12B:
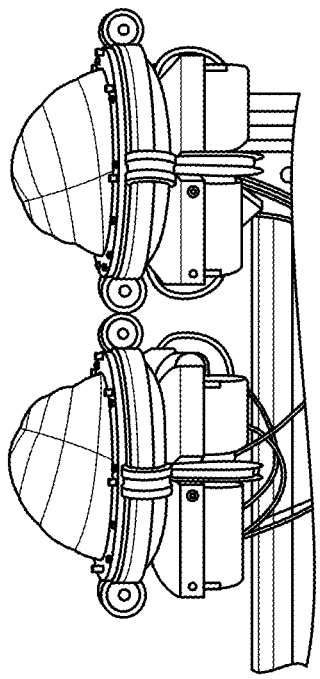
Figure 12C:
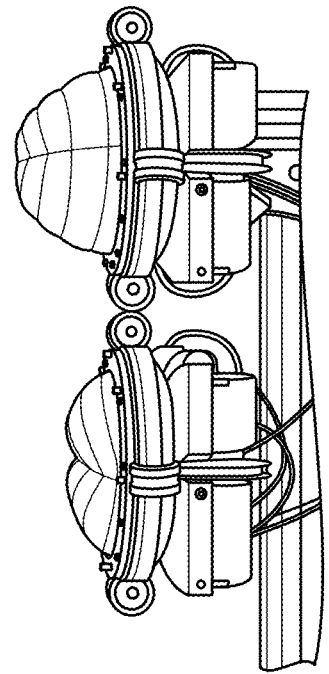
Figure 12D:
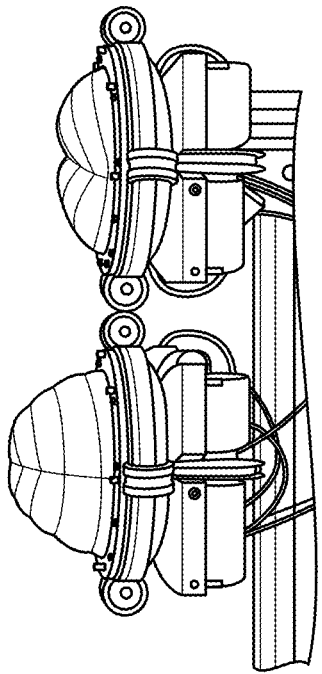

FIG. 9 shows the membrane tip location (e.g., the top-most point of the membrane; depicted as 1050 in FIG. 10) in an x-z coordinate plane as a function of tendon pull force applied to a single tendon (e.g., FIG. 8C and depicted by the diamonds) and an equal tendon pull force applied to each of the four tendons (e.g., depicted by the stars). Each apparatus was inflated to approximately 16.9 kilopascal (kPa) and 16.4 kPa, respectively, and the force required to retract a tendon to its initial embedded length was measured. For the single tendon, a force of 32.6 Newtons (N) was required to retract the single tendon. For the equivalently applied tension to each tendon, a force of 22.0 N per tendon.

Figure 11:
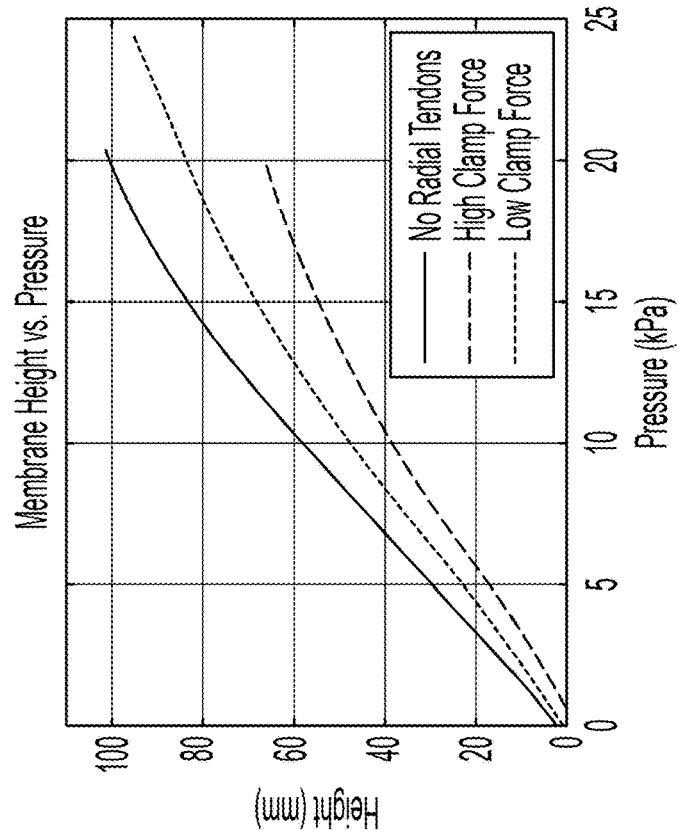
FIG. 11 shows the height of example inflatable apparatuses as a function of pressure, in accordance with some embodiments of the present invention.

FIG. 10 depicts an inflated fiber-reinforced elastomer membrane without tendons in the inflated state. The corresponding coordinate system also shown in FIG. 10 was obtained using motion capture markers, which were outfitted on the fiber-reinforced elastomer membrane, thus yielding a view of the fiber-reinforced elastomer membrane as shown. FIG. 11 depicts a plot of the height of the inflatable apparatus with tendons (as shown with the 'high clamp force' and 'low clamp force' curves) and without tendons. The high clamp force apparatus with a tendon-driven, fiber-reinforced elastomer membrane was fitted such that the clamp force was sufficient to stop fluid (e.g., air) from leaking under the clamp while the low clamp force apparatus with a tendon-driven, fiber-reinforced elastomer membrane was fitted such that the clamp force allowed for fluid leaks. The height of the inflated membrane is measured using the motion captured marker 1050, located at the center of the membrane. The stretch of the membrane along a tendon is measured by fitting a spline along the motion capture markers from the location of the clamp (e.g., at z=0 as shown by the coordinate system in FIG. 10) to the highest marker (e.g., 1050). Table 1 further describes the values depicted in FIG. 11.

TABLE 1

| Tendons Present | Clamp Force | Pressure (kPa) | Out-Of-Plane Extension | | Spline Stretch | | |
|---|---|---|---|---|---|---|---|
| | | | Height (mm) | % Diameter | Length Change (mm) | % Stretch | MPSS |
| None | High | 20.3 | 101.5 | 108 | 61.1 | 240 | 309 |
| 4 | Low | 23.9 | 95.3 | 101 | | | |
| 4 | High | 20.7 | 68.1 | 72 | 42.6 | 203 | 297 |

Table 1 above summarizes measures of FIG. 10. In particular, a maximum pressure, height, and change in diameter are shown. Further, the length change for the membrane was measured as the stretch of the elastomer along the path of the tendons as indicated by a spline between motion capture markers. The maximum percentage stretch of the spline (MPSS) is measured along the spline between two consecutive motion capture markers. Friction generated between a tendon and the elastomer may reduce the extension of the elastomer, particularly when a high clamp force is applied as tendons slide under the clamp. As such, it may be beneficial to lubricate the tendons such that the friction between the tendon and the elastomer is reduced. The tendons may be lubricated using any sufficient lubricant.

The ability to dynamically actuate the tendon-driven, fiber-reinforced elastomer membrane by controlling the applied tension and therefore the embedded length of the one or more tendons may allow for different tendon-driven, fiber-reinforced elastomer membrane geometries. Such controllability of tendon-driven, fiber-reinforced elastomer membrane geometries may be useful in a number of applications. In some embodiments, the tendon-driven, fiber-reinforced elastomer membrane may be used in robot locomotion. For example, the tendon-driven, fiber-reinforced elastomer membrane may serve as an actuating leg capable of facilitating the movement of a robot in a desired direction. In some embodiments, the tendon-driven, fiber-reinforced elastomer membrane may be used as an inflatable arm capable of large bending motion. In some embodiments, the controllability of the geometry of the tendon-driven, fiber-reinforced elastomer membrane may be used as an adjustable mold. For example, the tendon-driven, fiber-reinforced elastomer membrane may be inflated and/or actuated to a desired shape and filled or surrounded with a hardening material such that it may then serve as a mold or mold negative.

In additional embodiments, the tendon-driven, fiber-reinforced elastomer membrane may be used in vehicles as controllable surfaces. For example, the tendon-driven, fiber-reinforced elastomer membrane may allow one or more configurations of various vehicle surfaces be used to achieve morphing wings, nose cones, and the like. In still further embodiments, the tendon-driven, fiber-reinforced elastomer membrane may be used as bladders with adjustable mass distribution. For example, the tendon-driven, fiber-reinforced elastomer membrane may be used in fuel tanks to alter the distribution of fuel and thus adjust vehicle dynamics. As another example, the tendon-driven, fiber-reinforced elastomer membrane may be used as a controllable and variable buoyancy system in submersibles.

Figure 5A:
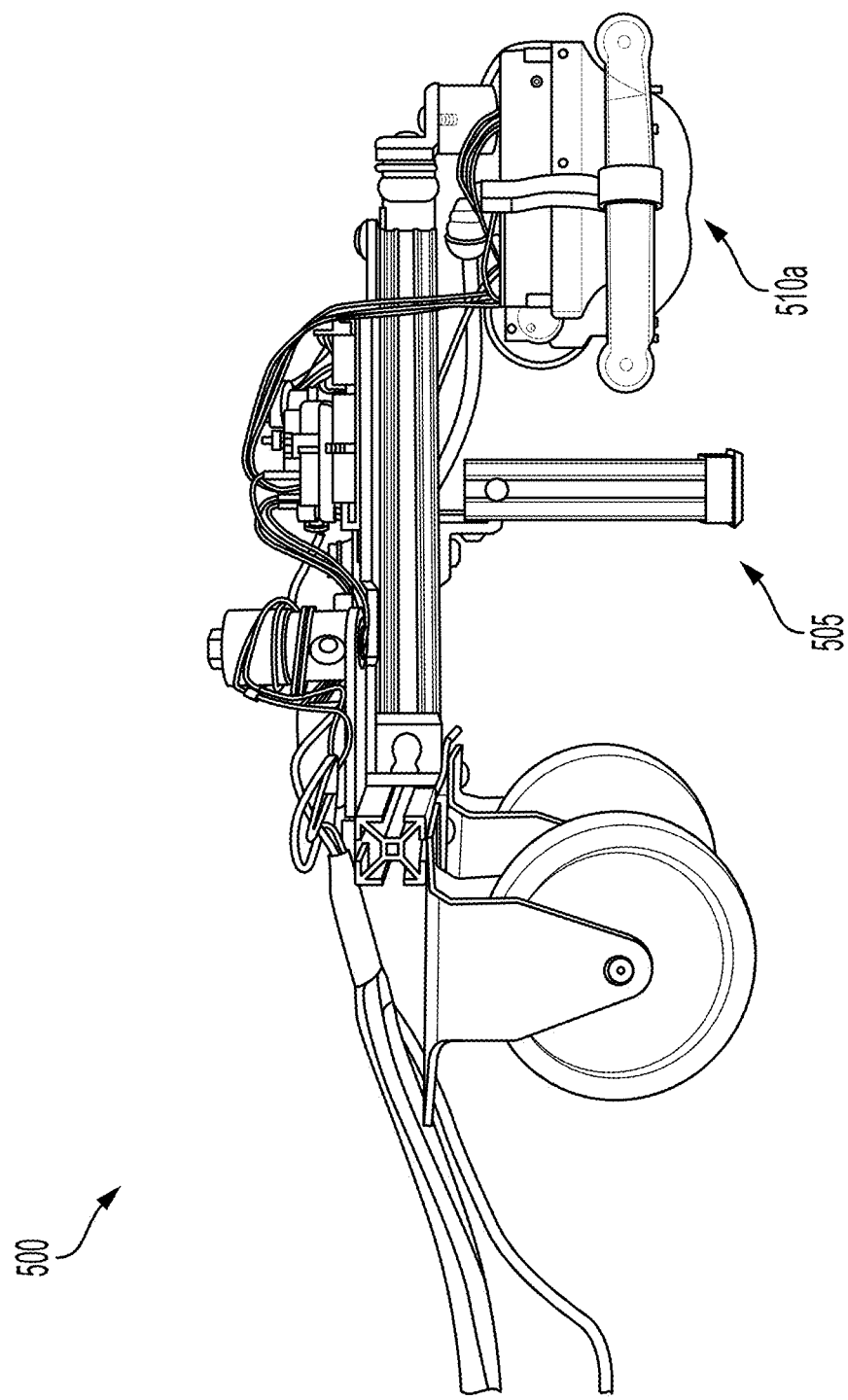

FIGS. 5A-D illustrate an example of the tendon-driven, fiber-reinforced elastomer membrane as used for robot locomotion. As shown in FIG. 5A, the robot 500 comprises a tendon-driven, fiber-reinforced elastomer membrane leg 510a. In some embodiments, the robot 500 may also comprise a support strut 505 to support the robot during periods of rest and/or before and/or after locomotion. In some embodiments, the robot 500 may further comprise one or more additional tendon-driven, fiber-reinforced elastomer membrane legs (not shown). Although in this particular example embodiment, only one tendon-driven, fiber-reinforced elastomer membrane 510a and support strut 505 are shown, any number of tendon-driven, fiber-reinforced elastomer membranes and support struts may be contemplated. The tendon-driven, fiber-reinforced elastomer membrane leg 510a is in the deflated state initially. While the tendon-driven, fiber-reinforced elastomer membrane leg 510a is in the deflated state, the support strut 505 is positioned substantially flat on the ground. The support strut 505 may provide support for the robot 500 while the tendon-driven, fiber-reinforced elastomer membrane leg 510a is in the deflated state. Additionally, or alternatively, in some embodiments, one or more additional tendon-driven, fiber-reinforced elastomer membrane legs may be configured to inflate during periods of rest and/or before and/or after locomotion of the robot 500 such that the one or more additional tendon-driven, fiber-reinforced elastomer membrane legs provides support for the robot 500.

FIG. 5B shows the tendon-driven, fiber-reinforced elastomer membrane leg 510b in the actuated state. During inflation of the tendon-driven, fiber-reinforced elastomer membrane leg 510b, the tendon-driven, fiber-reinforced elastomer membrane leg 510b may be actuated such that the tendon-driven, fiber-reinforced elastomer membrane 510b bends to the left. As described above, the tendon-driven, fiber-reinforced elastomer membrane 510c may be actuated using any suitable method. In this example embodiment, the tendon-driven, fiber-reinforced elastomer membrane 510b is actuated utilizing a servomotor and one or more pulleys as described in FIG. 3 and FIGS. 4A-C. Additionally, the tendon-driven, fiber-reinforced elastomer membrane leg 510b has been inflated such that support strut 505 no longer provides support for the robot 500. In some embodiments, the one or more additional tendon-driven, fiber-reinforced elastomer membrane legs may enter a deflated state or partially inflated state. The pressure exerted on the ground by the inflated tendon-driven, fiber-reinforced elastomer membrane leg 510b may due to the presence of internal fluid pressure within the cavity of the tendon-driven, fiber-reinforced elastomer membrane leg 510b. As the internal fluid is added to the cavity, e.g., as tendon-driven, fiber-reinforced elastomer membrane leg 510b is inflated, the internal fluid is constrained by the volume of the cavity and thus the internal fluid pressure increases. This results in the tendon-driven, fiber-reinforced elastomer membrane leg 510b applying a force on the ground and thus lifting the robot 500.

Figure 5C:
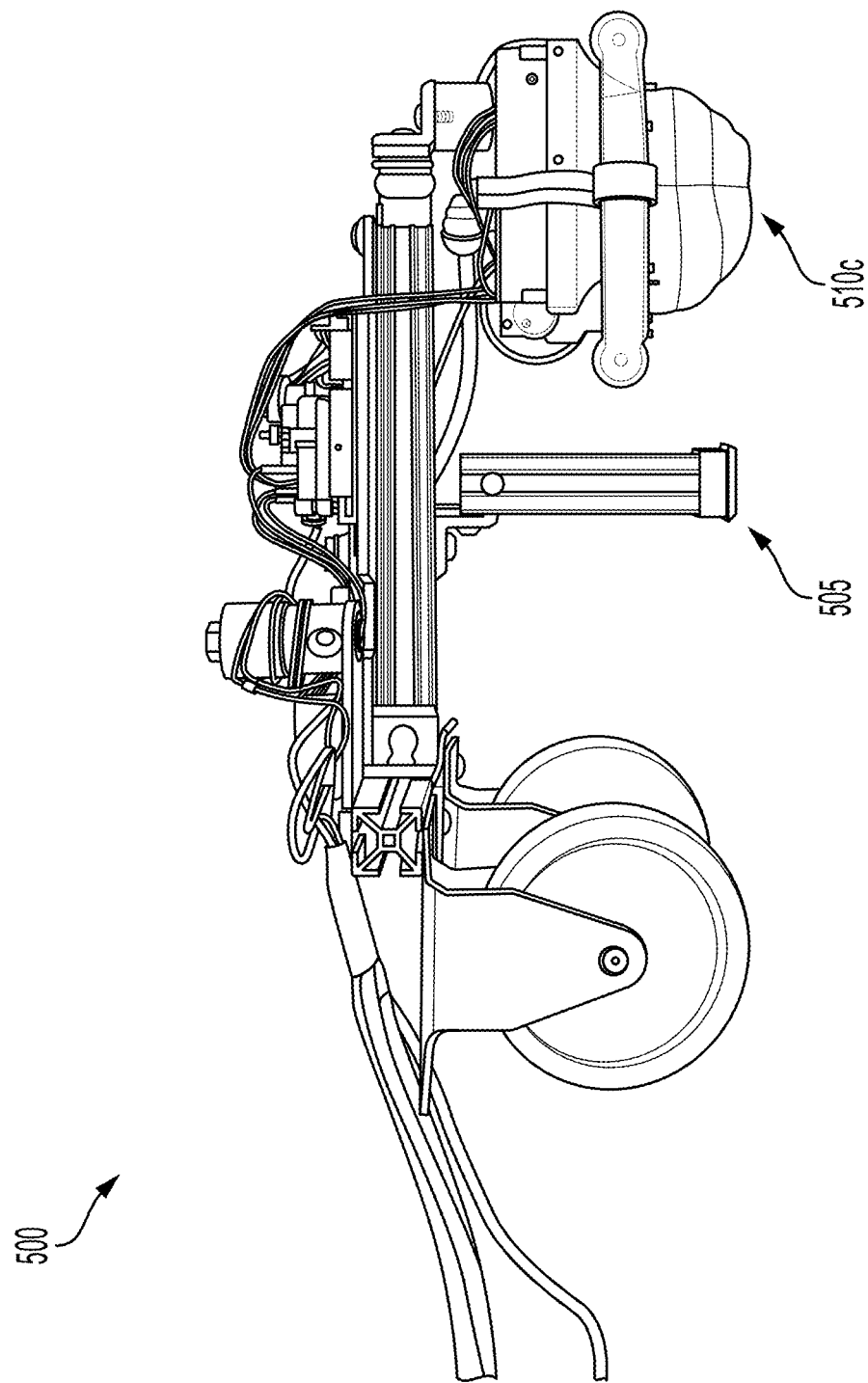

FIG. 5C shows the tendon-driven, fiber-reinforced elastomer membrane 510c such that it is no longer actuated and now in an inflated state. The tendon-driven, fiber-reinforced elastomer membrane 510c does not bend significantly in either direction. This may be accomplished by de-actuating the tendon-driven, fiber-reinforced elastomer membrane 510c such that no significant tension is applied to the tendon-driven, fiber-reinforced elastomer membrane 510c in any direction.

Figure 5D:
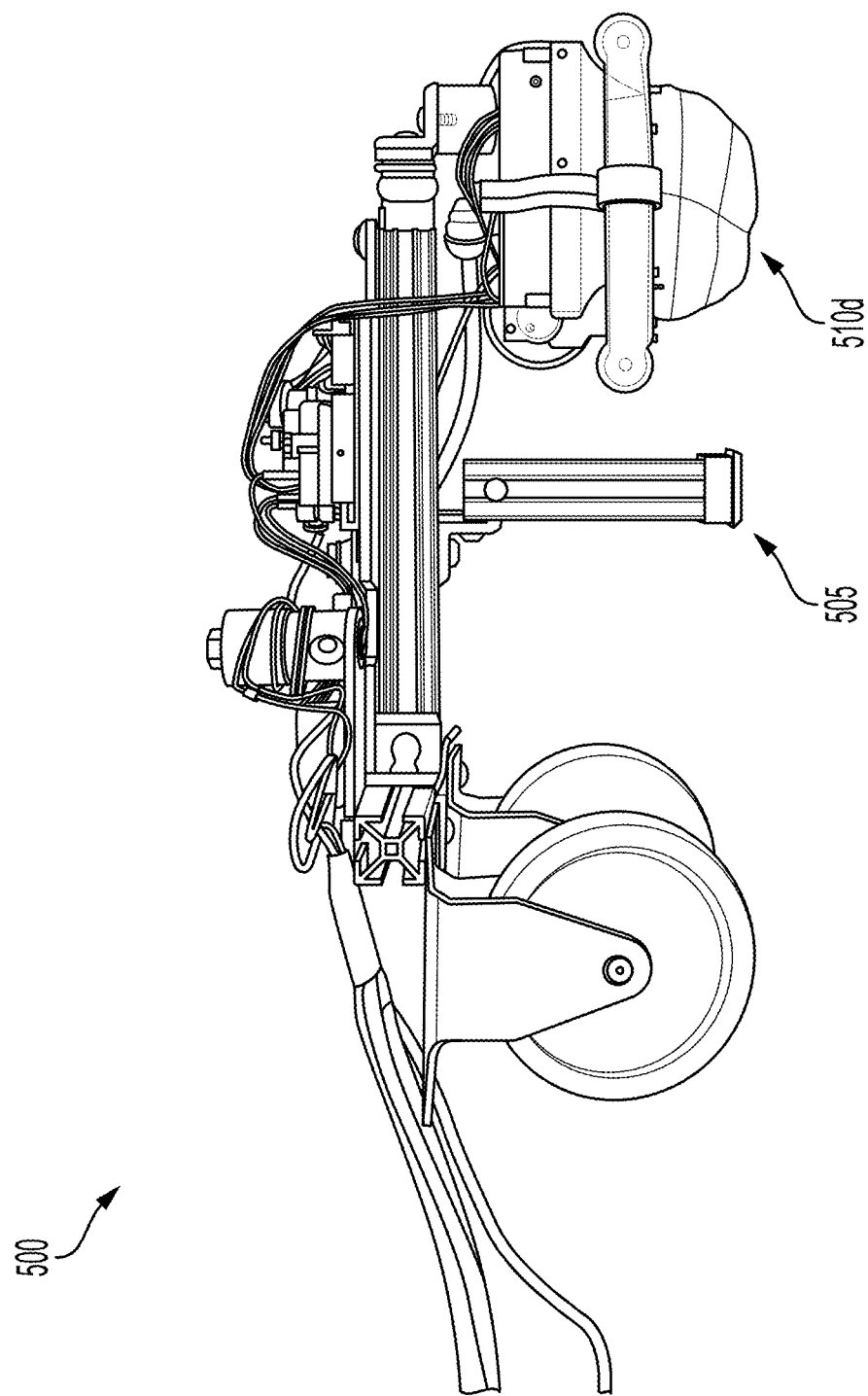

FIG. 5D shows the tendon-driven, fiber-reinforced elastomer membrane 510d actuated such that the tendon-driven, fiber-reinforced elastomer membrane 510d bends to the right. Similarly as described with respect to FIG. 5B, the tendon-driven, fiber-reinforced elastomer membrane 510c is actuated utilizing a servomotor and one or more pulleys as described in FIG. 3 and FIGS. 4A-C. More specifically, the tendon-driven, fiber-reinforced elastomer membrane leg 510d may be actuated such it rolls from the inflated position as depicted in FIG. 5C to the right bending position as depicted in FIG. 5D. Ultimately, the tendon-driven, fiber-reinforced elastomer membrane leg 510d is actuated such that it rolls from the left bending position depicted in FIG. 5B, to the inflated position depicted in FIG. 5C, to the right bending position depicted in FIG. 5D. This may be accomplished by controlling the length of the one or more tendons comprising the tendon-driven, fiber-reinforced elastomer membrane 510d and thus the tension experienced by the tendon-driven, fiber-reinforced elastomer membrane 510d.

The tendon-driven, fiber-reinforced elastomer membrane leg 510 may return to a fully deflated or partially deflated state and the support strut 505 may once again provide support for the robot 500, such as by inflating. Any portion of the process described above with reference to FIGS. 5A-D may be repeated as many times as necessary. As such, the robot 500 may exhibit locomotion that may be similar to walking. Additionally, or alternatively, the tendon-driven, fiber-reinforced elastomer membrane leg 510 may be actuated in any desired direction such that the robot 500 may turn to the right or left and/or move backwards.

FIGS. 12A-D and FIG. 13 depict the characterization of motion of an example robot which use one or more tendon-driven, fiber-reinforced elastomer membranes as legs. FIGS.

12A-D depict various configurations of two apparatuses configured with tendon-driven, fiber-reinforced elastomer membranes. The two apparatuses may work in tandem to allow an example robot (e.g., as shown in FIGS. 5A-D or FIGS. 14A-D) to perform locomotion. FIG. 13 depicts the tip path for each tendon-driven, fiber-reinforced elastomer membrane as it moves from the example positions depicted in FIG. 12A to FIG. 12B, from FIG. 12B to FIG. 12C, from FIG. 12C to FIG. 12D, and from FIG. 12D to FIG. 12A. This motion may be cyclical such that it repeats, and the example robot is able to continuously locomote. FIG. 13 further depicts the pressure applied to the tendon-driven, fiber-reinforced elastomer membrane by circulated fluid (e.g., air) during each example position.

Figure 14A:
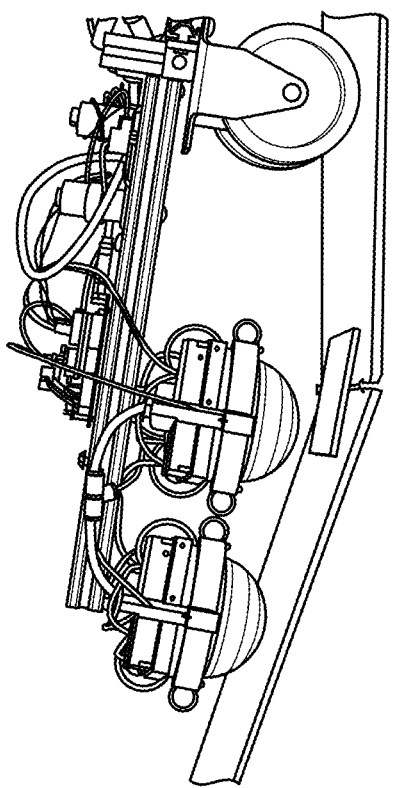
Figure 14B:
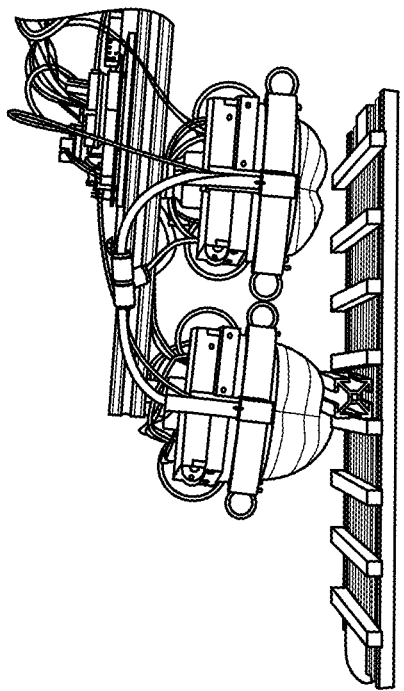
Figure 14C:
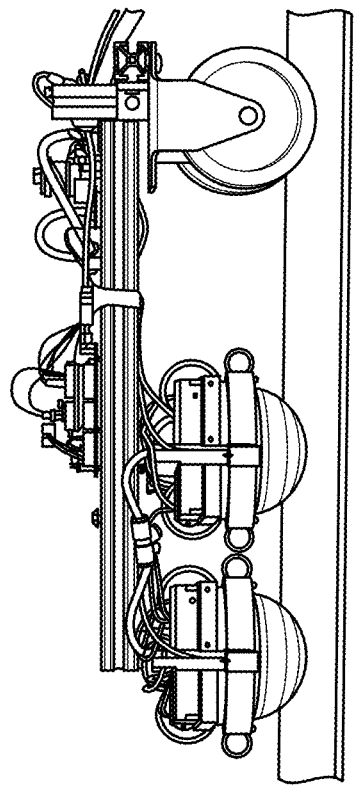
Figure 14D:
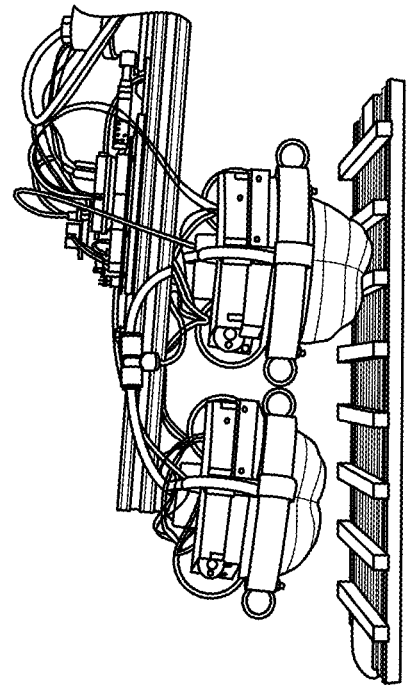

FIGS. 14A-D depict an example robot which uses tendon-driven, fiber-reinforced elastomer membrane legs as discussed above. Furthermore, the robot depicted in FIGS. 14-D may further be configured with wheels, which may add support to the stability of the robot and additionally aid in facilitating movement during locomotion. As shown in FIG. 14A-D, the robot may use the tendon-driven, fiber-reinforced elastomer membrane legs to travel on a flat surface (e.g., as depicted in FIG. 14A), a ramp (e.g., a 20° ramp as depicted in FIG. 14B), across a grate (e.g., as depicted in FIG. 14C), and across a grate with an obstacle (e.g., a 25.4-millimeter obstacle as depicted in FIG. 14D). The robot depicted in FIGS. 14A-D had a total mass of 3.5 kilograms (kg) and the front tendon-driven, fiber-reinforced elastomer membrane leg carried a load of up to 1.4 kg while the rear tendon-driven, fiber-reinforced elastomer membrane leg carried a load of up to 2.3 kg. This load difference may be due to the proximity of the tendon-driven, fiber-reinforced elastomer membrane leg to the wheels. The robot may achieve average locomotion speeds of 12.4 millimeters per second (mm/s) and/or turning speeds of 2 degrees per second (°/s).

Figure 6C:
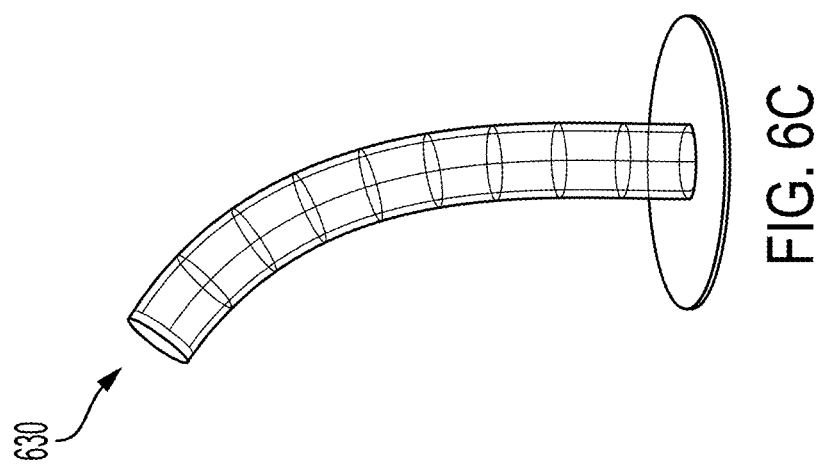
Figure 6B:
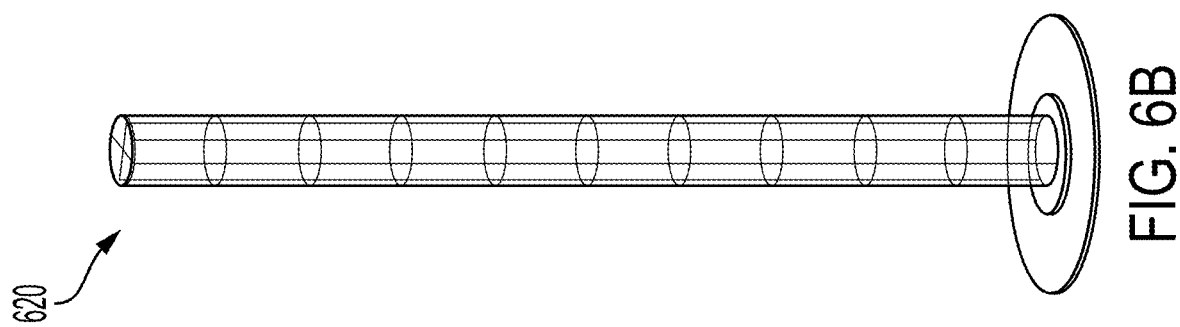
Figure 6A:
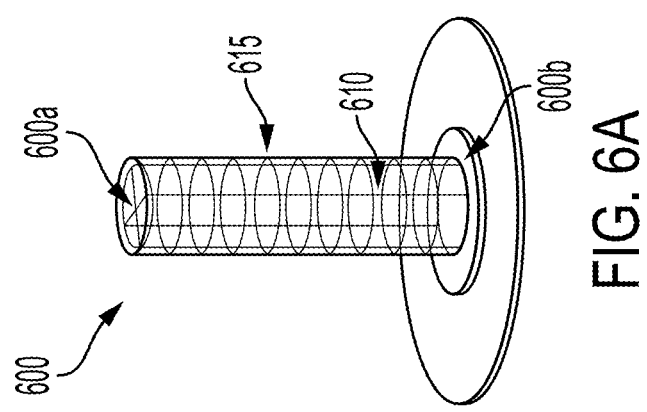

FIGS. 6A-C illustrate an example embodiment where the tendon-driven, fiber-reinforced elastomer membrane may function as an inflatable arm. The tendon-driven, fiber-reinforced elastomer membrane is depicted in the deflated state 600 in FIG. 6A. The tendon-driven, fiber-reinforced elastomer membrane may comprise one or more fixed fibers 615. The one or more fixed fibers 615 may be embedded midway through the thickness of the tendon-driven, fiber-reinforced elastomer membrane along its length. In some embodiments, the one or more fixed fibers 615 may be evenly spaced throughout the length of the tendon-driven, fiber-reinforced elastomer membrane. In some embodiments, the one or more fixed fibers 615 may limit the radial expansion of the tendon-driven, fiber-reinforced elastomer membrane.

In some embodiments, both ends of the tendon-driven, fiber-reinforced elastomer membrane are capped with one end configured with one or more fluid inlets. In some embodiments, the tendon-driven, fiber-reinforced elastomer membrane may comprise one or more tendons 610. The one or more tendons may be embedded midway through the thickness of the tendon-driven, fiber-reinforced elastomer membrane with attachment points at the distal end 600a and loose ends at the proximal end 600b of the tendon-driven, fiber-reinforced elastomer membrane.

FIG. 6B illustrates the tendon-driven, fiber-reinforced elastomer membrane during an inflated state 620. To achieve the inflated state 620, fluid may be pumped into the tendon-driven, fiber-reinforced elastomer membrane and causes the tendon-driven, fiber-reinforced elastomer membrane to expand along its longitudinal axis. In some embodiments, the inflated state 620 of the tendon-driven, fiber-reinforced elastomer membrane may exhibit significant elongation as compared to its deflated state. In some embodiments, longitudinal length of the tendon-driven, fiber-reinforced elastomer membrane may elongate by up to 900% of its deflated longitudinal length.

FIG. 6C illustrates the tendon-driven, fiber-reinforced elastomer membrane during an actuated state 630. Similarly, as described above, the length of and the tension applied by the one or more tendons 610 may be controlled in any suitable manner. By actuating the tendon-driven, fiber-reinforced elastomer membrane, a bending motion may be achieved as depicted in FIG. 6C. In some embodiments, the one or more tendons may have different attachment points such that a wide range of bending motions may be achieved. For example, one or more tendons may be knotted around one or more fixed fibers other than the fixed fiber located at the distal end 600a.

Many modifications and other embodiments of the invention set forth herein will come to mind to one skilled in the art to which the invention pertains having the benefit of the teachings presented in the foregoing descriptions and the associated drawings. Therefore, it may be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A tendon-driven, fiber-reinforced elastomer membrane comprising:
    an elastomer matrix material; and
    a fiber array embedded within the elastomer matrix material,
    wherein:
        the fiber array comprises one or more tendons;
        the one or more tendons are not mechanically bonded to the elastomer matrix material such that the one or more embedded tendons are able to move through the elastomer matrix material;
        the one or more tendons are configured to be pulled by one or more attachment points onto an innermost fixed fiber and allow for expansion to occur; and
        each of the one or more attachment points includes one or more knots formed by a tendon around one or more fixed fibers.

2. The tendon-driven, fiber-reinforced elastomer membrane of claim 1, wherein the fiber array further comprises one or more fixed fibers.

3. The tendon-driven, fiber-reinforced elastomer membrane of claim 2, wherein the one or more fixed fibers are mechanically bonded to the elastomer matrix material.

4. The tendon-driven, fiber-reinforced elastomer membrane of claim 2, wherein the one or more fixed fibers are arranged as one or more concentric circles.

5. The tendon-driven, fiber-reinforced elastomer membrane of claim 4, wherein the one or more fixed fibers comprise two or more fixed fibers arranged as two or more concentric circles each have varying radii.

6. The tendon-driven, fiber-reinforced elastomer membrane of claim 4, wherein the one or more fixed fibers comprise two or more fixed fibers arranged as two or more concentric circles each have the same radii.

7. The tendon-driven, fiber-reinforced elastomer membrane of claim 4, wherein the one or more fixed fibers form five or more concentric circles.

8. The tendon-driven, fiber-reinforced elastomer membrane of claim 2, wherein the tendon-driven, fiber-reinforced elastomer membrane comprises one or more attachment points.

9. The tendon-driven, fiber-reinforced elastomer membrane of claim 8, wherein the one or more attachment points comprise mechanical bonding between one or more tendons and one or more fixed fibers.

10. The tendon-driven, fiber-reinforced elastomer membrane of claim 1, wherein the shape of the tendon-driven, fiber-reinforced elastomer membrane is one of: conical, spherical, or planar.

11. The tendon-driven, fiber-reinforced elastomer membrane of claim 1, wherein the elastomer matrix material expands by up to 900 percent.

12. The tendon-driven, fiber-reinforced elastomer membrane of claim 1, wherein the tendon-driven, fiber-reinforced elastomer membrane is incorporated as one or both of: a leg of a robot or an inflatable arm.

13. An inflatable apparatus comprising:
a tendon-driven, fiber-reinforced elastomer membrane, each of the one or more tendon-driven, fiber-reinforced elastomer membranes comprising:
an elastomer matrix material; and
a fiber array embedded within the elastomer matrix material, wherein:
the fiber array comprises one or more tendons; and
the one or more tendons are not mechanically bonded to the elastomer matrix material such that the one or more embedded tendons are able to move through the elastomer matrix material; and
the one or more tendons are configured to be pulled by one or more attachment points onto an innermost fixed fiber and allow for expansion to occur, and
each of the one or more attachment points includes one or more knots formed by a tendon around one or more fixed fibers
a rigid plate, wherein the rigid plate comprises one or more fluid ports;
a clamp ring; and
one or more securing components, wherein the one or more securing components secures the clamp ring to the rigid plate.

14. The inflatable apparatus of claim 13, wherein the tendon-driven, fiber-reinforced elastomer membrane is mounted upon the rigid plate and secured to the rigid plate utilizing the clamp ring and one or more securing components.

15. The inflatable apparatus of claim 13, wherein the inflatable apparatus is inflated by filling the cavity between the tendon-driven, fiber-reinforced elastomer membrane and the fixed plate with one or more fluids.

16. The inflatable apparatus of claim 13, wherein the inflatable apparatus enters an actuated state by applying tension to the one or more tendons.

17. The inflatable apparatus of claim 13, wherein the fiber array further comprises one or more fixed fibers.

18. The inflatable apparatus of claim 17, wherein the one or more fixed fibers are mechanically bonded to the elastomer matrix material.

19. The inflatable apparatus of claim 17, wherein the one or more fixed fibers comprise two or more fixed fibers arranged in two or more concentric circles having either varying or the same radii.

20. The inflatable apparatus of claim 17, wherein the tendon-driven, fiber-reinforced elastomer membrane comprises one or more attachment points.

21. The inflatable apparatus of claim 20, wherein the one or more attachment points comprise mechanical bonding between one or more tendons and one or more fixed fibers.

22. The inflatable apparatus of claim 13, wherein the shape of the tendon-driven, fiber-reinforced elastomer membrane is one of conical, spherical, or planar.

23. The inflatable apparatus of claim 13, further comprising:
one or more pulleys each configured to house a portion of the external portion of the length of one or more tendons; and
a servomotor configured to apply one or more forces to the one or more tendons.

24. The inflatable apparatus of claim 23, wherein the servomotor is further configured to measure the embedded length of the one or more tendons.

25. The inflatable apparatus of claim 23, wherein the servomotor is further configured to measure one or more torque forces applied to the tendon-driven, fiber-reinforced elastomer membrane.

26. The inflatable apparatus of claim 13, wherein the inflatable apparatus is incorporated as one of a leg of a robot or an inflatable arm.

* * * * *